DEFENSIVE PUBLICATION

UNITED STATES PATENT OFFICE

Published at the request of the applicant or owner in accordance with the Notice of Dec. 16, 1969, 869 O.G. 687. The abstracts of Defensive Publication applications are identified by distinctly numbered series and are arranged chronologically. The heading of each abstract indicates the number of pages of specification, including claims and sheets of drawings contained in the application as originally filed. The files of these applications are available to the public for inspection and reproduction may be purchased for 30 cents a sheet.

Defensive Publication applications have not been examined as to the merits of alleged invention. The Patent Office makes no assertion as to the novelty of the disclosed subject matter.

PUBLISHED APRIL 23, 1974

921 O.G. 1308

T921,027

MOLDABLE POLYESTER FABRICS

Harry William Stanhope, 2440 Sugar Mill Road, Charlotte, N.C. 28210

Continuation of abandoned application Ser. No. 185,398, Sept. 30, 1971. This application Sept. 17 ,1973, Ser. No. 398,123

Int. Cl. D06c *29/00*

U.S. Cl. 161—72

No Drawing. 13 Pages Specification

A process is provided for preparing novel moldable fabrics, particularly fabrics comprising polyester staple fibers. These fabrics can be handled without significant distortion and can be molded into articles having deep draw contours, good shape retention of the mold, high strength, and good adhesion to plastisol coatings. Typically a conventional fabric comprising heat shrinkable yarn is heated to a temperature from about 200° F. to 400° F. under substantially zero tension for a period from about 1 second to about 30 minutes. The moldable fabrics have an area draw ratio greater than nine and handling elongation below 100%.